(12) United States Patent (10) Patent No.: US 8,161,728 B2
Kupratis (45) Date of Patent: Apr. 24, 2012

(54) GAS TURBINES WITH MULTIPLE GAS FLOW PATHS

(75) Inventor: Daniel B. Kupratis, Wallingford, CT (US)

(73) Assignee: United Technologies Corp., Hartford, CT (US)

( * ) Notice: Subject to any disclaimer, the term of this patent is extended or adjusted under 35 U.S.C. 154(b) by 1330 days.

(21) Appl. No.: 11/770,024

(22) Filed: Jun. 28, 2007

(65) Prior Publication Data

US 2009/0000270 A1 Jan. 1, 2009

(51) Int. Cl.
*F02C 3/04* (2006.01)
(52) U.S. Cl. ........ 60/262; 60/226.1; 60/39.183; 60/268; 60/39.162; 415/124.1
(58) Field of Classification Search ............... 60/262, 60/226.3, 268, 39.162; 415/124.1
See application file for complete search history.

(56) References Cited

U.S. PATENT DOCUMENTS

| | | | |
|---|---|---|---|
| 3,282,053 A | 11/1966 | Messerschmitt | |
| 3,729,957 A * | 5/1973 | Petrie et al. | 60/226.1 |
| 3,861,139 A | 1/1975 | Jones | |
| 4,005,575 A | 2/1977 | Scott et al. | |
| 4,010,608 A | 3/1977 | Simmons | |
| 4,070,825 A | 1/1978 | Kronogard | |
| 4,376,375 A * | 3/1983 | Boudigues | 60/226.3 |
| 4,704,862 A | 11/1987 | Dennison et al. | |
| 4,964,844 A * | 10/1990 | Bagnall | 475/295 |
| 5,042,245 A * | 8/1991 | Zickwolf, Jr. | 60/773 |
| 5,402,638 A | 4/1995 | Johnson | |
| 5,485,717 A | 1/1996 | Williams | |
| 5,687,563 A | 11/1997 | Thompson, Jr. | |
| 5,694,765 A | 12/1997 | Hield et al. | |
| 5,816,042 A | 10/1998 | Guinan et al. | |
| 6,102,329 A | 8/2000 | Guinan et al. | |
| 6,209,311 B1 | 4/2001 | Itoh et al. | |
| 6,647,708 B2 | 11/2003 | Bornhoft et al. | |
| 7,058,556 B2 | 6/2006 | Desai et al. | |
| 7,614,210 B2 | 11/2009 | Powell | |
| 2005/0241291 A1 * | 11/2005 | Bart et al. | 60/226.1 |
| 2006/0201160 A1 | 9/2006 | Richards | |

* cited by examiner

*Primary Examiner* — William H Rodriguez
*Assistant Examiner* — Steven Sutherland
(74) *Attorney, Agent, or Firm* — Carlson, Gaskey & Olds, P.C.

(57) ABSTRACT

A representative gas turbine includes: a high pressure spool; a high pressure compressor; a high pressure turbine mechanically coupled to the high pressure spool; a lower pressure spool; a lower pressure turbine mechanically coupled to the lower pressure spool; a fan having a first set of fan blades and a second set of fan blades, the second set of fan blades being located downstream of the first set of fan blades and being operative to rotate at a rotational speed corresponding to a rotational speed of the lower pressure spool; and a gear assembly mechanically coupled to the lower pressure spool and engaging the first set of fan blades such that rotation of the lower pressure spool rotates the first set of fan blades at a lower rotational speed than the rotational speed of the second set of fan blades.

14 Claims, 4 Drawing Sheets

GAS TURBINES WITH MULTIPLE GAS FLOW PATHS

BACKGROUND

1. Technical Field

The present disclosure generally relates to gas turbines.

2. Description of the Related Art

A typical single-spool gas turbine incorporates an intake that provides a flow of gas, e.g., air, to a compressor, a combustion section and a turbine in sequence. The turbine and the compressor are linked to each other via a spool. In operation, energy generated by combustion of a fuel-air mixture in the combustion section is converted to rotational energy by the turbine. The rotational energy is imparted to the compressor via the spool for compressing additional gas received through the intake.

Multi-spool gas turbines also are known, each of which typically includes multiple turbines and multiple compressors. Conventionally, the spools of a multi-spool gas turbine are concentric, with each being linked to a corresponding compressor-turbine pair.

SUMMARY

An exemplary embodiment of a gas turbine comprises: a high pressure spool; a high pressure compressor; a high pressure turbine mechanically coupled to the high pressure spool; a lower pressure spool; a lower pressure turbine mechanically coupled to the lower pressure spool; a fan having a first set of fan blades and a second set of fan blades, the second set of fan blades being located downstream of the first set of fan blades and being operative to rotate at a rotational speed corresponding to a rotational speed of the lower pressure spool; and a gear assembly mechanically coupled to the lower pressure spool and engaging the first set of fan blades such that rotation of the lower pressure spool rotates the first set of fan blades at a lower rotational speed than the rotational speed of the second set of fan blades.

Another exemplary embodiment of a gas turbine comprises: a spool; a turbine mechanically coupled to the spool; a multi-stage fan having a first set of blades and a second set of blades, the second set of blades being located downstream of the first set of blades and being operative to rotate with the spool; and means for enabling the first set of blades to rotate at a lower rotational speed than the second set of blades.

Another exemplary embodiment of a multi-stage fan assembly for a gas turbine comprises: an epicyclic gear having a ring gear; and a first set of fan blades operative to rotate at a speed of the ring gear.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Figure 1:
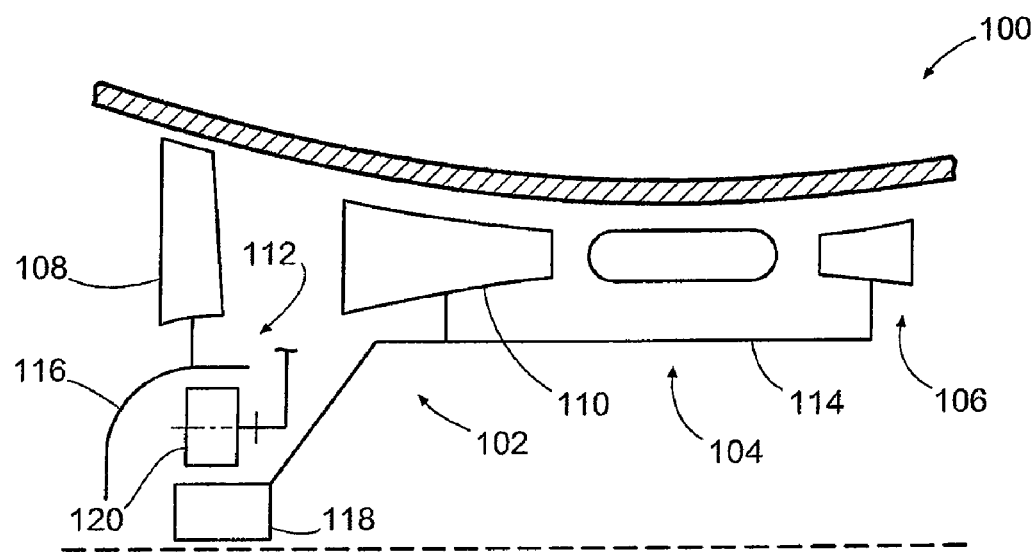
FIG. 1 is a schematic diagram depicting an embodiment of a gas turbine.

A representative embodiment of a gas turbine is shown schematically in FIG. 1. As shown in FIG. 1, gas turbine 100 includes a compressor 102, a combustion section 104 and a turbine 106. Thus, the embodiment of FIG. 1, the compressor, combustion section and turbine define a gas flow path that has a normal flow direction from the compressor to the turbine.

Notably, compressor 102 incorporates a first set of blades 108 and other sets of blades 110. The first set to blades 1U engages a gear assembly 112. In this embodiment, the gear assembly is configured such that the first set of blades 108 rotates at a slower rotational speed than that of the other sets of compressor blades 110. Notably, all of the blades of the compressor and of the turbine are driven by a single spool 114.

With respect to the gear assembly 112, the embodiment of FIG. 1 incorporates an epicyclic gear. Although capable of various dimensions and arrangements, in this embodiment, the first set of blades 108 of the compressor is coupled to the ring gear 116 of the epicyclic gear and the spool 114 is coupled to the sun gear 118. Note also that, in this embodiment, the rotational axes of the planet gears 120 are fixed in position relative to a non-moving portion of the gas turbine. By way of example, in some embodiments, the carrier that mounts the planet gears is mounted to the turbine casing.

Figure 2:
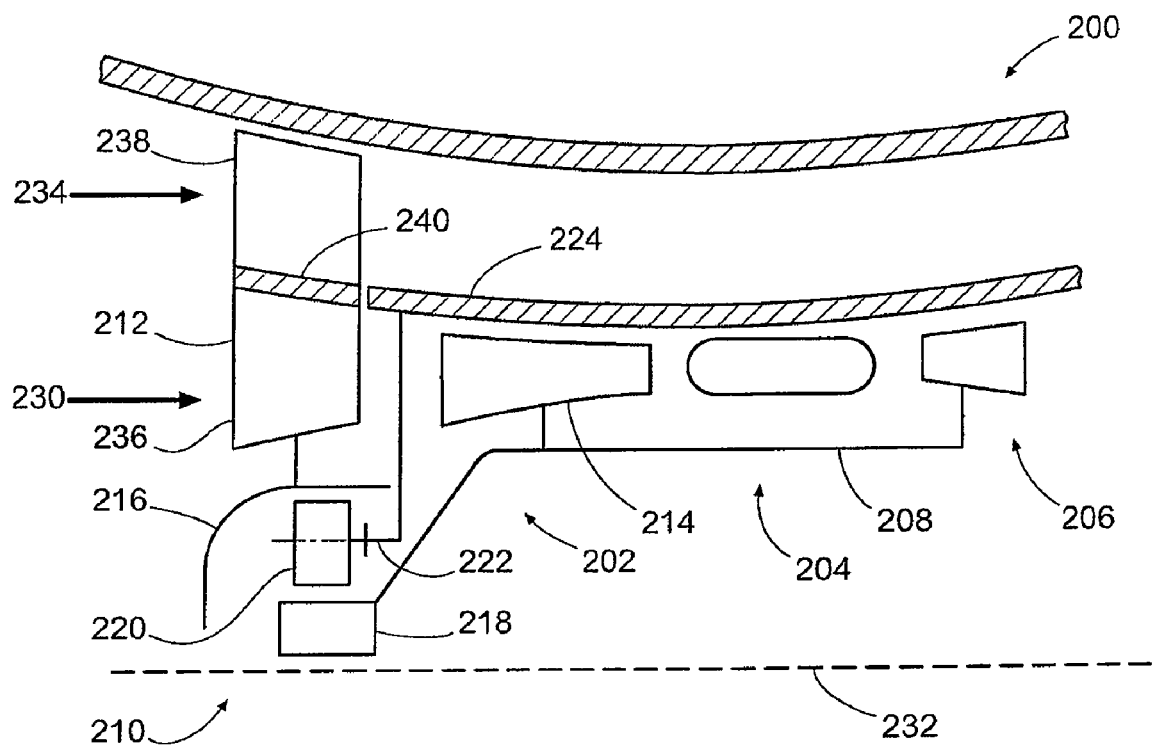
FIG. 2 is a schematic diagram depicting another embodiment of a gas turbine

FIG. 2 is a schematic diagram depicting another embodiment of a gas turbine. As shown in FIG. 2, gas turbine 200 incorporates a compressor 202, a combustion section 204 and a turbine 206. In this embodiment, the compressor and turbine are coupled to a single spool 208 that engages a gear assembly 210. Specifically, the gear assembly enables a first set of compressor blades 212 to rotate at a different speed than the speed at which a second set of compressor blades 214 rotate. Notably, compressor blades 214 include one or more set of blades that are located downstream of the first set of blades 212.

In this embodiment, gear assembly 210 incorporates an epicyclic gear that engages the first set of blades via ring gear 216 and engages the spool 208 via sun gear 218. Note also that the planet gears 220 in this embodiment are held by a carrier 222 that is fixed in position by being mounted to turbine casing 224.

Gas turbine 200 also incorporates two gas flow paths. In particular, the turbine, the combustion section and a portion of the compressor are positioned along a first gas flow path 230, which is radially located closest to the gas turbine centerline 232. Radially outboard of the first gas flow path is a second gas flow path 234. Notably, the first set of blades 212 of the compressor is configured to compress gas travelling along both the first and second gas flow paths. Specifically, each blade of the first set incorporates an inboard portion 236 positioned along the first gas flow path and outboard portion 238 positioned along the second gas flow path. An intermediate shroud 240 or other barrier is located between the two portions 236, 238. Thus, the compressor (e.g., the first set of blades 212) mechanically divides the inlet flow of gas into separate inner and outer annular gas flow paths (230, 234). Therefore, only the gas travelling along the inner gas flow path 230 experiences additional stages of the compressor, the combustion section and the turbine.

Figure 3:
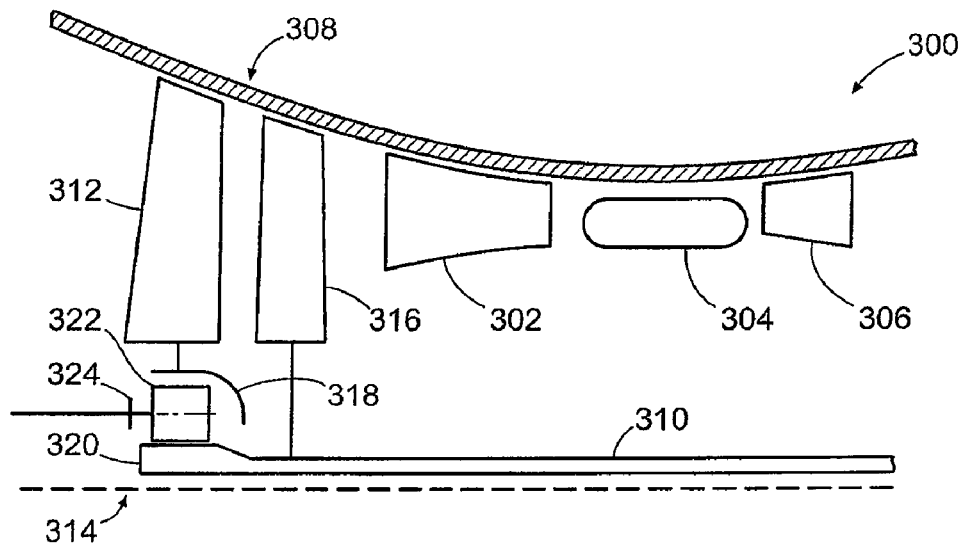
FIG. 3 is schematic diagram depicting another embodiment of a gas turbine.

FIG. 3 is a schematic diagram of another embodiment of the gas turbine. As shown in FIG. 3, gas turbine 300 includes a compressor 302, a combustion section 304 and a turbine 306. Although depicted in proximity to the combustion section, various components such as compressors and/or turbines can be interposed between the compressor 302 and combustion section and/or between combustion section and turbine 306. This is also the case for other embodiments.

Gas turbine 300 also incorporates a multi-stage fan 308 that is driven by a spool 310. Specifically, a first set of fan blades 312 is driven by the spool via a gear assembly 314 and a second set of blades 316 is driven directly by the spool without any intervening gearing. In this embodiment, the gear assembly comprises an epicyclic gear, of which the ring gear 318 is coupled to the fan blades 312 and the sun gear 320 is coupled to spool 310 for driving the fan blades 316. In operation, rotation of the spool causes the fan blades 316 to rotate at a corresponding speed, while the gear assembly 314 causes the fan blades 312 to rotate at a different speed, which is typically slower. Note also that, in this embodiment, the axes of rotation of the planet gears 322 are held by a carrier 324 that is fixed in position relative to a non-moving portion of the gas turbine such as a case or other stationary support.

Figure 4:
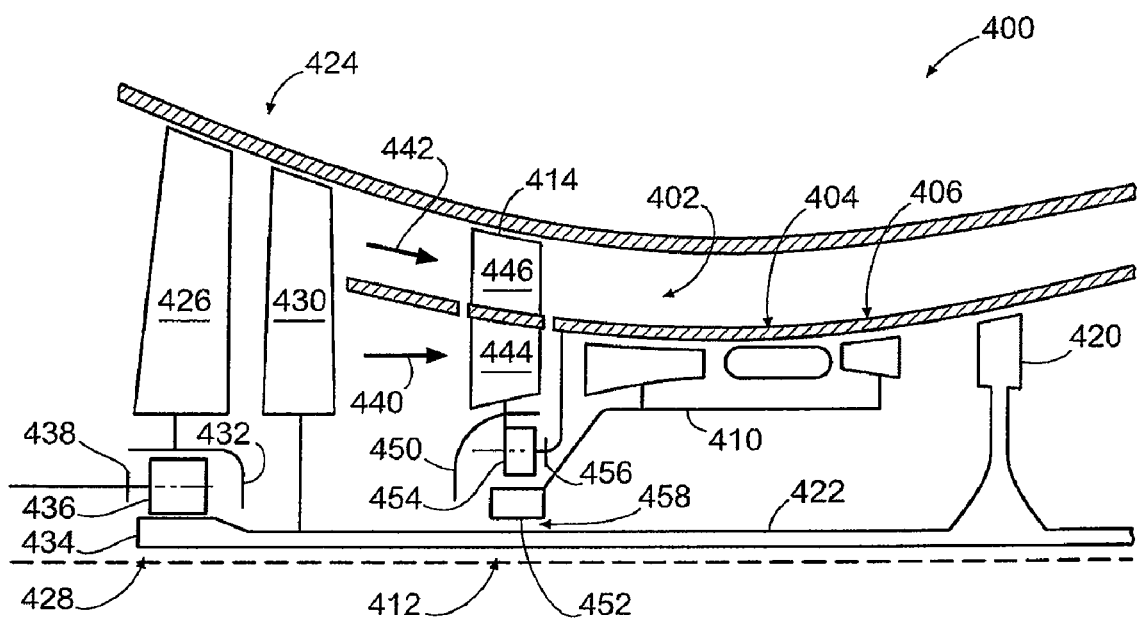
FIG. 4 is a schematic diagram depicting another embodiment of a gas turbine

Another embodiment of gas turbine is depicted schematically in FIG. 4. As shown in FIG. 4, gas turbine 400 incorporates a high pressure compressor 402, a combustion section 404 and a high pressure turbine 406. The high pressure compressor and high pressure turbine are interconnected with and driven by a high spool 410. Spool 410 also drives a first set of blades 414 of the high pressure compressor via an interposed gear assembly 412.

Gas turbine 400 also incorporates a lower pressure turbine 420 (e.g., a low pressure turbine) that is interconnected with and drives a low spool 422. Spool 422 drives at least some of the blades of a multi-stage fan 424. In particular, the multi-stage fan incorporates a first set of blades 426, which is driven by spool 422 via an intervening gear assembly 428, and a second set of blades 430, which is driven at a speed directly corresponding to the rotational speed of the spool 422. In this embodiment, the gear assembly incorporates an epicyclic gear, the ring gear 432 of which is coupled to the blades 426 and the sun gear 434 of which is coupled to spool 422. Note also that, in this embodiment, the axes of rotation of the planet gears 436 are held by a carrier 438 that is fixed in position relative to a non-moving portion of the gas turbine.

In operation, intake gas is acted upon by the first set of blades 426 of the multi-stage fan and then by the second set of blades 430, which rotates at a faster speed than the first set of blades 426. Thereafter, the gas is diverted to flow either along a first gas flow path 440 or a second gas flow path 442. Along the first gas flow path, the gas interacts with inboard portions 444 of a first set of compressor blades 414 that rotate at a speed that is slower than a subsequent set of blades of the compressor 402. This speed differential is facilitated by the gear assembly 412.

Gear assembly 412 incorporates another epicyclic gear, the ring gear 450 of which is coupled to the compressor blades 414 and the sun gear 452 of which is coupled to spool 410. Note also that, in this embodiment, the axes of rotation of the planet gears 454 are held by a carrier 456 that is fixed in position relative to a non-moving portion of the gas turbine. Additionally, the sun gear 452 includes a central aperture 458 through which spool 422 extends.

After passing through the compressor 402, gas flowing along the first gas flow path travels through the combustion section 404, the high pressure turbine 406 and the lower pressure turbine 420 in sequence. In contrast, downstream of the multi-stage fan 424, gas flowing along the second gas flow path is acted upon by outboard portions 446 of the first set of compressor blades 414. Thereafter, the gas does not pass through additional stages of the compressor, the combustion section, the high pressure turbine or the lower pressure turbine.

Figure 5:
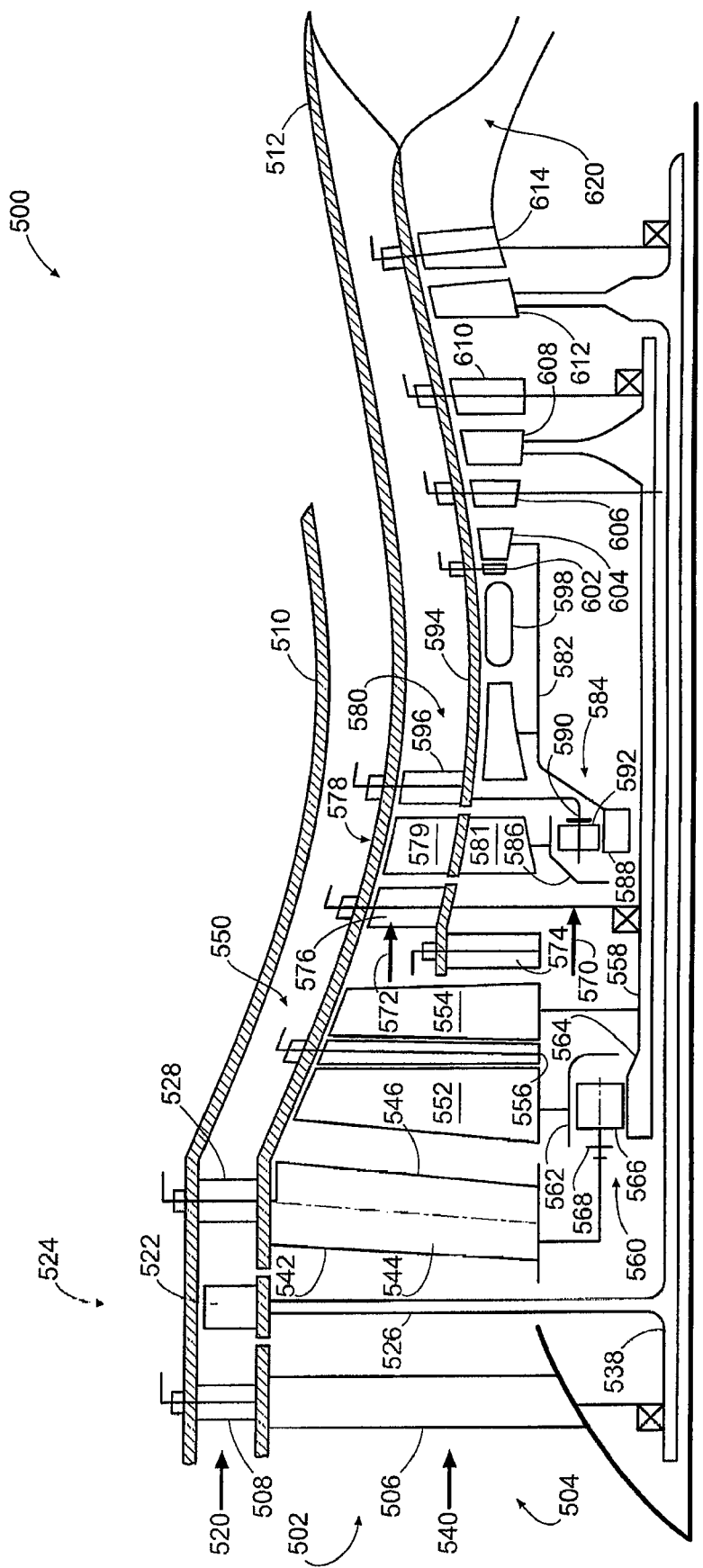
FIG. 5 is schematic diagram depicting another embodiment of a gas turbine.

FIG. 5 schematically depicts another embodiment of the gas turbine. As shown in FIG. 5, gas turbine 500 incorporates various components that will be described generally in sequential order starting from the upstream or inlet side. In this regard, gas entering inlet 502 encounters a strut assembly 504, an inboard portion of which is configured as a strut 506 that mounts an adjustable inlet guide vane 508. The vane 508 is positioned between an outer shroud 510 and an inner shroud 512, a portion of which divides the strut assembly into inboard (strut) and outboard (vane) portions. Notably, the inner shroud divides the flow of gas such that an outer annular gas flow path 520 is created that surrounds an inner annular gas flow path 540.

After passing the strut assembly, gas travelling along the gas flow path 520 interacts with tip rotor blades 522 of an outboard, auxiliary fan 524. In this embodiment, the tip rotor blades are mounted to distal ends of radially extending spokes 526 of a Cortland Burge Wheel (CBW) that is driven by a spool 538. The spokes of this embodiment are not aerodynamic bodies, in that the spokes are designed not to impact flow characteristics of the gas travelling through the spokes substantially.

Downstream of the tip rotor blades 522 of the auxiliary fan, gas travelling along the gas flow path 520 encounters an adjustable exit guide vane 528. Thereafter, the gas is directed through the annular path between adjacent shrouds 510, 512 before exiting as exhaust.

Along the gas flow path 540 downstream of the spokes 526 of the CBW, the gas encounters an adjustable inlet guide vane 542 that, in this embodiment, incorporates a fixed leading edge portion 544 and a variable trailing edge portion 546. Downstream of the vane 542, a multi-stage fan 550 is positioned. In this embodiment, the multi-stage fan incorporates a first set of blades 552 and a second set of blades 554 between which is interposed a set of adjustable stator vanes 556. Notably, the second set of fan blades 554 is driven by a spool 558 at a higher rotational speed than the rotational speed of the first set of blades 552. In this regard, a gear assembly 560 is mechanically coupled between the first set of fan blades and the spool 558 so that the blades of the first set exhibit a slower rotational speed.

In the embodiment of FIG. 5, the gear assembly 560 incorporates an epicyclic gear, the ring 562 of which is coupled to the first set of fan blades and the sun gear 564 of which is coupled to the spool 558 for driving the second set of fan blades. Note that the planet gears 566 are held by a carrier 568 that is fixed in position by mounting to a non-moving portion of the gas turbine. In this embodiment, the carrier is attached to the fixed leading edge portion 544 of the vane 542. Note also that the sun gear 564 includes an aperture through which spool 538 passes.

Downstream of the multi-stage fan, the gas flow diverges again. This time, the inner annular gas flow path 540 is separated into a gas flow path 570 and a gas flow path 572. Each of these gas flow paths incorporates an adjustable inlet guide vane (574, 576) at its respective inlet. In this embodiment, the vanes 574, 576 are separately controllable to provide highly adjustable flow controllability.

A set of blades 578 of a high pressure compressor 580 is located downstream of the vanes 574, 576 along each of the gas flow paths 570, 572. Specifically, in this embodiment, the set of blades 578 forms a first stage of the high pressure compressor, with outboard portions 579 being located along the path 572 and inboard portions 581 being located along the path 570. Others of the sets of blades of the high pressure compressor (in this case, all of the subsequent sets of blades) are located only along the innermost gas flow path 570. Despite being driven by the same spool 582, the first set of blades is driven at a slower rotational speed than at least some of the other blades of the high pressure compressor. This is accomplished by mechanically coupling a gear assembly 584 between the first set of blades and the spool 582.

In this embodiment, the gear assembly includes an epicyclic gear, the ring gear 586 of which is coupled to the first set of blades and the sun gear 588 of which is coupled to the spool. Note that, in this embodiment, carrier 590 that holds the planet gears 592 is fixed in position relative to the gas turbine by attachment to the turbine casing 594. Note also that the sun gear 588 includes an aperture through which spools 558 and 538 pass.

Returning briefly to the radially central gas flow path 572, downstream of the outboard portions of the first set of compressor blades, gas encounters an adjustable guide vane 596. Thereafter, the gas travels the remainder of the gas flow path 572 as defined by the turbine casing 594 and the inner shroud 512. In contrast, after departing the high pressure compressor, gas travelling along the gas flow path 570 is directed through a combustion section 598 and thereafter through an adjustable inlet guide vane 602 prior to entering a high pressure turbine 604. Note that the high pressure turbine is used to drive spool 582.

An adjustable exit guide vane 606 is positioned downstream of the high pressure turbine. The vane 606 also functions as an adjustable inlet guide vane for an intermediate pressure turbine 608. The intermediate pressure turbine drives spool 558, which powers the multi-stage fan 550.

An adjustable exit guide vane 610 is located downstream of the intermediate pressure turbine that also functions as an adjustable inlet guide vane for a low pressure turbine 612. The low pressure turbine drives the spool 558, which powers the auxiliary fan 524. An adjustable exit guide vane 614 is located downstream of the low pressure turbine.

In the embodiment of FIG. 5, a mixer 620 is used to mix gas exiting from the gas flow paths 570, 572. Additionally or alternatively, fan air from the gas flow path 520 can exit through a separate nozzle, which may or may not be variable in exit area (not shown).

In operation, an embodiment of a gas turbine such as that depicted in FIG. 5 can potentially provide enhanced flow controllability and corresponding improvements in performance at various power and operating conditions. By way of example, allowing the low pressure turbine to drive the auxiliary fan can potentially enable improved matching of the flow and power requirements of the auxiliary fan with the flow and power output of the low power turbine. In some embodiments, this matching can be enhanced by the use of adjustable geometry inlet and exit guide vanes associated with the auxiliary fan, as well as adjustable geometry inlet and exit guide vanes of the low pressure turbine.

Additionally or alternately, adjustable geometry inlet and exit vanes affecting the outboard portions of the blades of the high pressure compressor can enable an improved matching of the flow and pressure of the gas flow path 570 with the exit flow and pressure of the gas flow path 572. Such improved matching can potentially reduce turbine screech, for example.

Additionally, or alternatively, improved matching of the speed, flow and power of each spool can be achieved by the adjustable geometry inlet and exit vanes of each of the turbines.

Additionally or alternatively, use of a gear assembly can enable slower rotor tip speeds of at least some of the upstream blades of the high pressure compressor and higher rotor tip speeds of at least some of the downstream blades of the high pressure compressor. Similarly, use of a gear assembly can enable at least one upstream stage of a multi-stage fan to exhibit a slower rotor tip speed than the rotor tip speed at least one downstream stage.

Figure 6:
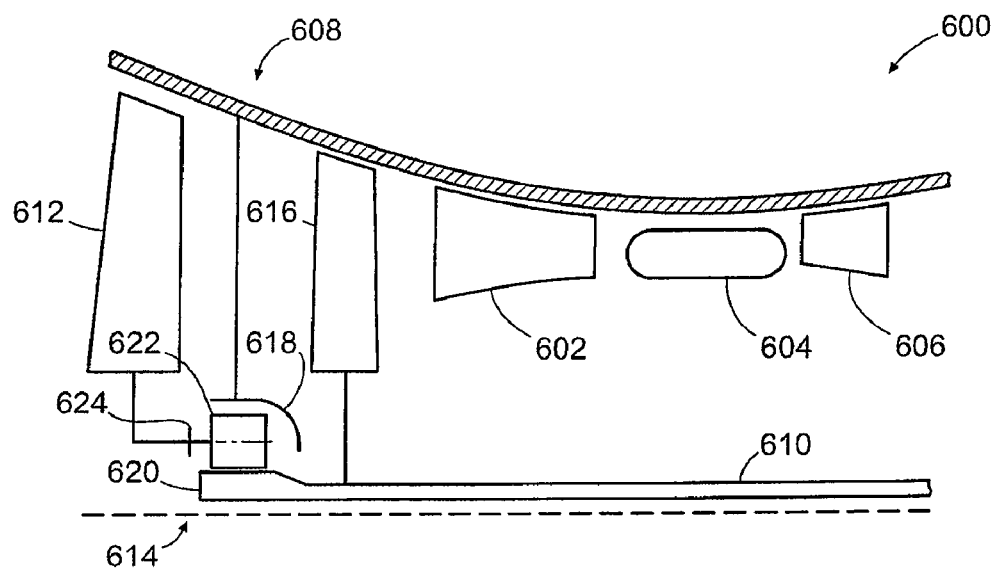
FIG. 6 is schematic diagram depicting still another embodiment of a gas turbine.

FIG. 6 is a schematic diagram of another embodiment of the gas turbine. As shown in FIG. 6, gas turbine 600 includes a compressor 602, a combustion section 604 and a turbine 606. Although depicted in proximity to the combustion section, various components such as compressors and/or turbines can be interposed between the compressor 602 and combustion section and/or between combustion section and turbine 606. This is also the case for other embodiments.

Gas turbine 600 also incorporates a multi-stage fan 608 that is driven by a single spool 610. Specifically, a first set of fan blades 612 is driven by the spool via a gear assembly 614 and a second set of blades 616 is driven directly by the spool without any intervening gearing. In this embodiment, the gear assembly comprises an epicyclic gear, of which the planet carrier 624 is coupled to the fan blades 612 and the sun gear 620 is coupled to spool 610 for driving the fan blades 616. In operation, rotation of the spool causes the fan blades 616 to rotate at a corresponding speed, while the gear assembly 614 causes the fan blades 612 to rotate at a different, typically slower, speed. Note also that, in this embodiment, the axes of rotation of the planet gears 622 are held by a ring gear 618 that is fixed in position relative to a non-moving portion of the gas turbine.

Figure 7:
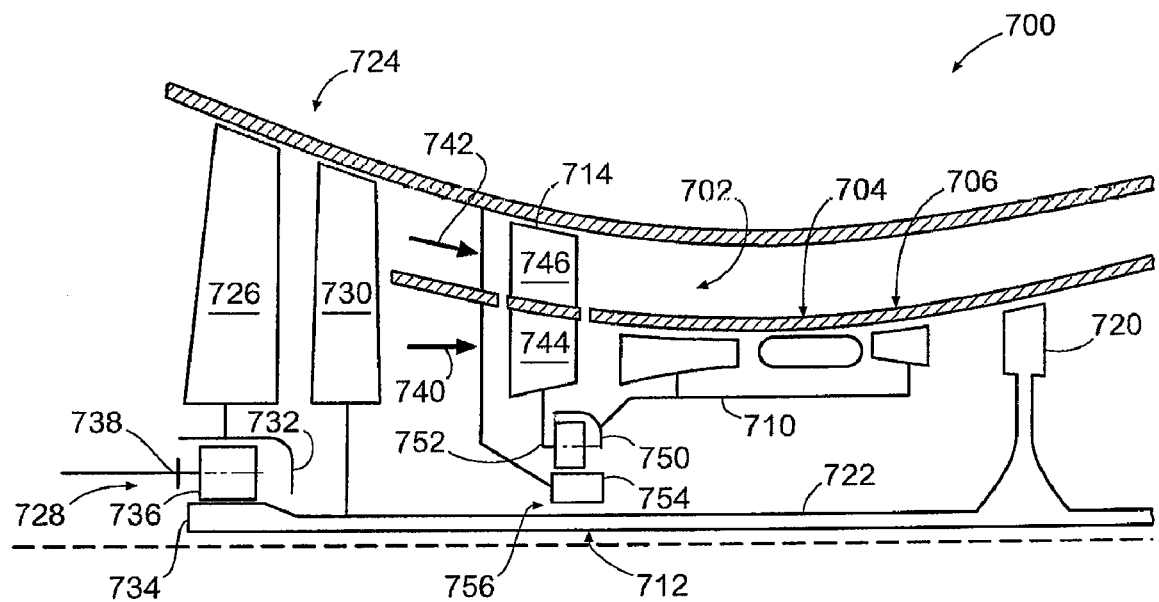
FIG. 7 is schematic diagram depicting yet another embodiment of a gas turbine.

Another embodiment of gas turbine is depicted schematically in FIG. 7. As shown in FIG. 7, gas turbine 700 incorporates a high pressure compressor 702, a combustion section 704 and a high pressure turbine 706. The high pressure compressor and high pressure turbine are interconnected with and driven by a spool 710. Spool 710 also drives a first set of blades 714 of the high pressure compressor via an interposed gear assembly 712.

Gas turbine 700 also incorporates a lower pressure turbine 720 (e.g., a low pressure turbine) that is interconnected with and drives a spool 722. Spool 722 drives at least some of the blades of a multi-stage fan 724. In particular, the multi-stage fan incorporates a first set of blades 726, which is driven by spool 722 via an intervening gear assembly 728, and a second set of blades 730, which is driven at a speed directly corresponding to the rotational speed of the spool 722. In this embodiment, the gear assembly incorporates an epicyclic gear, the ring gear 732 of which is coupled to the blades 726 and the sun gear 734 of which is coupled to spool 722. Note also that, in this embodiment, the axes of rotation of the planet gears 736 are held by a carrier 738 that is fixed in position relative to a non-moving portion of the gas turbine.

In operation, intake gas is acted upon by the first set of blades 726 of the multi-stage fan and then by the second set of blades 730, which rotates at a different, e.g., faster, speed than the first set of blades 726. Thereafter, the gas is diverted to flow either along a first gas flow path 740 or a second gas flow path 742. Along the first gas flow path, the gas interacts with inboard portions 744 of a first set of compressor blades 714 that rotate at a speed that is typically slower than a subsequent set of blades of the compressor 702. This speed differential is facilitated by the gear assembly 712 which incorporates another epicyclic gear, the ring gear 750 of which is coupled to the compressor blades 702 and the planet carrier 752 which is coupled to compressor blades 714. Note also that, in this embodiment, the axes of rotation of the planet carrier 752 and ring gear 750 are held by a sun gear 754 that is fixed in position relative to a non-moving portion of the gas turbine. Additionally, the sun gear 754 includes a central aperture 756 through which spool 722 extends.

After passing through the compressor 702, gas flowing along the first gas flow path travels through the combustion section 704, the high pressure turbine 706 and the lower pressure turbine 720 in sequence. In contrast, downstream of the multi-stage fan 724, gas flowing along the second gas flow path is acted upon by outboard portions 746 of the first set of compressor blades 714. Thereafter, the gas does not pass through additional stages of the compressor, the combustion section, the high pressure turbine or the lower pressure turbine.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A gas turbine comprising:
a high pressure spool;
a high pressure compressor;
a high pressure turbine mechanically coupled to the high pressure spool;
a lower pressure spool;
a lower pressure turbine mechanically coupled to the low pressure spool;
a fan having a first set of fan blades and a second set of fan blades, the second set of fan blades being located downstream of the first set of fan blades and being operative to rotate at a rotational speed corresponding to a rotational speed of the lower pressure spool; and
a gear assembly mechanically coupled to the lower pressure spool and engaging the first set of fan blades such that rotation of the lower pressure spool rotates the first set of fan blades at a lower rotational speed than the rotational speed of the second set of fan blades and wherein
the gear assembly comprises an epicyclic gear having a sun gear, multiple planet gears and a ring gear, the sun gear having an aperture;
the sun gear is coupled to the lower pressure turbine; and
the lower pressure spool passes through the aperture of the sun gear.

2. The gas turbine of claim 1, wherein the gear assembly comprises an epicyclic gear having a sun gear, multiple planet gears and a ring gear.

3. The gas turbine of claim 2, wherein:
the gas turbine further comprises a casing surrounding at least a portion of the fan; and
rotational axes of the multiple planet gears are fixed in position relative to the casing.

4. The gas turbine of claim 2, wherein the sun gear is coupled to the lower pressure turbine and the ring gear is coupled to the first set of blades of the fan.

5. The gas turbine of claim 1, wherein the second set of blades of the fan is coupled to the lower pressure spool without any intervening gearing.

6. The gas turbine of claim 1, wherein:
the high pressure turbine and the lower pressure turbine define a first gas flow path;
the gas turbine defines a second gas flow path located radially outboard of the first gas flow path; and
the fan is operative to provide flows of gas to both the first gas flow path and the second gas flow path.

7. The gas turbine of claim 6, wherein:
the high pressure compressor has a first set of blades;
at least one of the first set of blades of the high pressure compressor is a split rotor having an inboard portion and an outboard portion, the inboard portion being located along the first gas flow path; and
the outboard portion of the split rotor is located along the second gas flow path.

8. The gas turbine of claim 1, wherein:
the lower pressure spool is a low pressure spool and the lower pressure turbine is a low pressure turbine; and
the gas turbine further comprises:
an intermediate pressure spool; and
an intermediate pressure turbine mechanically coupled to the intermediate pressure spool.

9. The gas turbine of claim 8, further comprising an adjustable fan inlet guide vane operative to adjust gas flow provided to an inlet side of the fan.

10. The gas turbine of claim 9, wherein:
the high pressure turbine, the intermediate pressure turbine and the low pressure turbine define a first gas flow path;
the gas turbine defines a second gas flow path located radially outboard of the first gas flow path; and
wherein the adjustable fan inlet guide vane is operative to adjust gas flow along the first gas flow path; and
wherein the adjustable fan inlet guide vane is operative to adjust gas flow along the first gas flow path and the second gas flow path.

11. The gas turbine of claim 8, further comprising an auxiliary fan coupled to and operative to be driven by the low pressure spool.

12. A gas turbine comprising:
a high pressure spool;
a high pressure compressor;
a high pressure turbine mechanically coupled to the high pressure spool;
a low pressure spool;
a low pressure turbine mechanically coupled to the low pressure spool;
a fan having a first set of fan blades and a second set of fan blades, the second set of fan blades being located downstream of the first set of fan blades and being operative to rotate at a rotational speed corresponding to a rotational speed of the lower pressure spool;
a gear assembly mechanically coupled to the lower pressure spool and engaging the first set of fan blades such that rotation of the lower pressure spool rotates the first set of fan blades at a lower rotational speed than the rotational speed of the second set of fan blades;

an intermediate pressure spool; and
an intermediate pressure turbine mechanically coupled to the intermediate pressure spool and an auxiliary fan coupled to and operative to be driven by the low pressure spool.

13. The gas turbine of claim 12, further comprising a rotor wheel with faired spokes having a set of spokes and a set of tip rotors, wherein the auxiliary fan comprises the set of tip rotors.

14. The gas turbine of claim 13, wherein:
the fan is operative to provide flows of gas to both the first gas flow path and the second gas flow path;
the gas turbine defines a third gas flow path located radially outboard of the second gas flow path; and
the set of tip rotors is located along the third gas flow path.

* * * * *